United States Patent
BenHanokh et al.

(10) Patent No.: US 11,449,229 B2
(45) Date of Patent: Sep. 20, 2022

(54) DYNAMICALLY RESIZING A REGION OF VOLATILE MEMORY BASED ON A CHARGE LEVEL OF A BACKUP BATTERY SUPPLY

(71) Applicant: RED HAT, INC., Raleigh, NC (US)

(72) Inventors: Gabriel Zvi BenHanokh, Tel-Aviv (IL); Joshua Durgin, Canyon County, CA (US)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 17/074,985

(22) Filed: Oct. 20, 2020

(65) Prior Publication Data

US 2022/0121371 A1  Apr. 21, 2022

(51) Int. Cl.
*G06F 3/06* (2006.01)
*G06F 1/3212* (2019.01)

(52) U.S. Cl.
CPC .......... *G06F 3/0608* (2013.01); *G06F 1/3212* (2013.01); *G06F 3/0619* (2013.01); *G06F 3/0625* (2013.01); *G06F 3/0631* (2013.01); *G06F 3/0653* (2013.01); *G06F 3/0673* (2013.01)

(58) Field of Classification Search
CPC ............. G06F 12/0871; G06F 12/0866; G06F 12/0848; G06F 12/084; G06F 3/0608; G06F 3/0619; G06F 3/0625; G06F 3/0631; G06F 3/0673; G06F 3/0653; G06F 1/3212
See application file for complete search history.

(56) References Cited

U.S. PATENT DOCUMENTS

| | | | |
|---|---|---|---|
| 5,396,637 A * | 3/1995 | Harwell | G06F 11/1441 365/228 |
| 6,957,355 B2 * | 10/2005 | Acton | G06F 11/1441 710/52 |
| 8,886,911 B2 | 11/2014 | Nemazie et al. | |
| 9,128,845 B2 | 9/2015 | Chang et al. | |
| 9,552,294 B2 | 1/2017 | Sim et al. | |
| 9,939,873 B1 | 4/2018 | Catalano et al. | |
| 10,275,003 B2 | 4/2019 | Park et al. | |
| 10,509,723 B1 | 12/2019 | Szczepanik et al. | |
| 10,565,108 B2 | 2/2020 | Sreedhar et al. | |

(Continued)

OTHER PUBLICATIONS

"Intel® RAID Smart Battery User's Guide," Intel Corporation, 2007, https://www.intel.com/content/dam/support/us/en/documents/motherboards/server/sb/d92010_1axxrsbbu4_uguide.pdf.

(Continued)

*Primary Examiner* — Hiep T Nguyen
(74) *Attorney, Agent, or Firm* — Kilpatrick Townsend & Stockton LLP

(57) ABSTRACT

A region of a volatile memory can be dynamically resized based on a charge level of a backup battery supply. For example, a computing device can have a volatile memory with a memory region for storing data. The computing device can also have an attached backup battery supply. The computing device can determine a charge level of the backup battery supply and adjust a size of the memory region based on the determined charge level. Adjusting the size of the memory region can involve changing an amount of the volatile memory that is allocated to the memory region.

20 Claims, 5 Drawing Sheets

---

502
Determine a charge level of a backup battery supply coupled to a computing device 504
Adjust a size of a memory region in a volatile memory of the computing device based on the determined charge level

(56) References Cited

U.S. PATENT DOCUMENTS

| | | | | |
|---|---|---|---|---|
| 2011/0191535 A1* | 8/2011 | Yuasa | ................. | G06F 1/32 |
| | | | | 711/113 |
| 2012/0096225 A1* | 4/2012 | Khawand | ............ | G06F 12/0848 |
| | | | | 711/119 |
| 2017/0364792 A1* | 12/2017 | Chai | ................. | G06N 3/063 |
| 2020/0019622 A1* | 1/2020 | Lu | ................. | G06F 16/1748 |

OTHER PUBLICATIONS

"General Information on Dell PowerEdge RAID Controller (PERC) Battery Functions and Reconditioning," Dell Technologies, 2015, https://www.dell.com/support/article/en-in/sln148456/general-information-on-dell-poweredge-raid-controller-perc-battery-functions-and-reconditioning?lang=en.

"Enabling HDD Write-Back Cache on Intel® Modular Server Systems," Intel Corporation, 2017, https://www.intel.com/content/www/us/en/support/articles/000008121/server-products/server-systems.html.

* cited by examiner

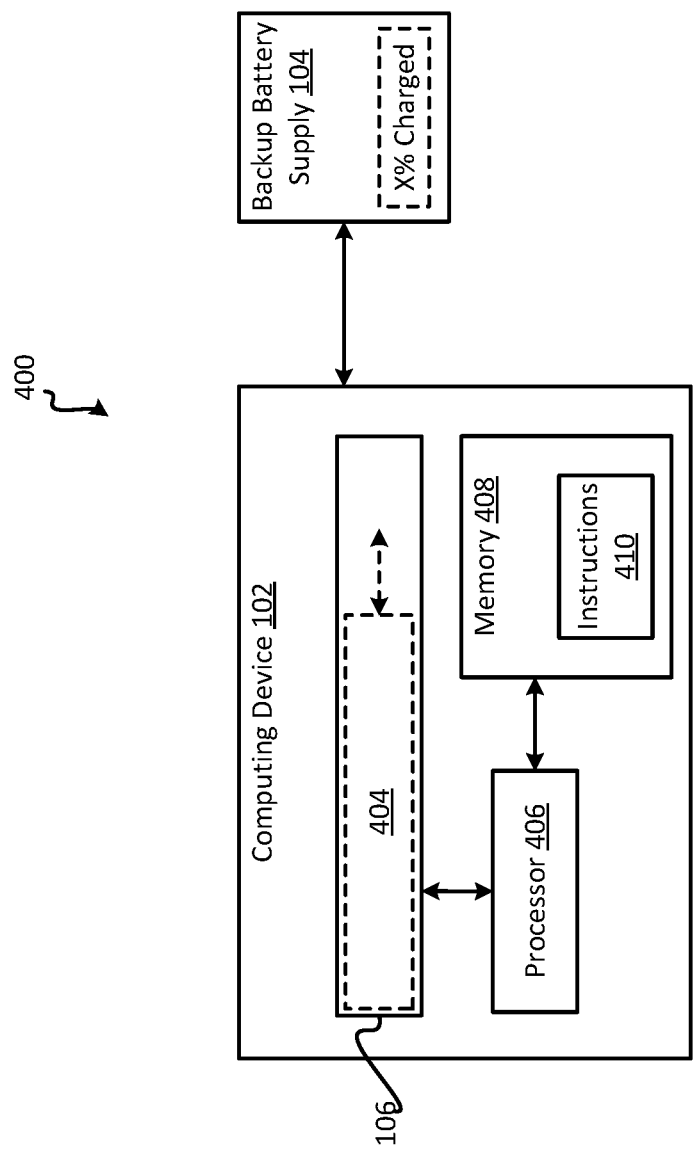

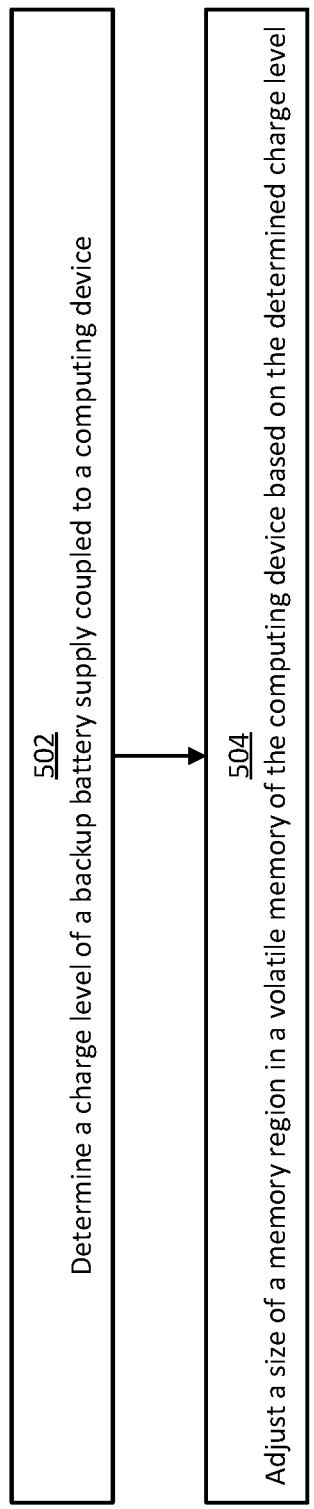

DYNAMICALLY RESIZING A REGION OF VOLATILE MEMORY BASED ON A CHARGE LEVEL OF A BACKUP BATTERY SUPPLY

TECHNICAL FIELD

The present disclosure relates generally to data storage. More specifically, but not by way of limitation, this disclosure relates to dynamically resizing a region of volatile memory based on a charge level of a backup battery supply.

BACKGROUND

Storage systems for storing data may implement various techniques to improve their performance. One common technique is write-back caching. Write-back caching can involve a storage system receiving a request to store data and responsively storing the data in cache memory, without writing the data to disk. The system can maintain the data in the cache memory until an event occurs that makes writing to disk desirable, at which point the system can then write the data to disk. Write-back caching can significantly improve the performance of the storage system because write-back caching allows for data-write aggregation in cache memory and minimizes disk writes, which are relatively slow. But given the volatile nature of cache memory, write-back caching is generally implemented on storage systems that have backup power supplies to prevent cached data from being inadvertently erased due to power loss.

Another common technique for improving the performance of a storage system is read caching. Read caching can involve a storage system receiving a request to read data, retrieving the data from a disk, and storing the data in cache memory. Storing the data in the cache memory can make the data more quickly accessible in the future, because reading data from cache memory can be significantly faster than reading the data from the disk. As a result, read caching can enable the storage system to more rapidly respond to future requests for the data.

BRIEF DESCRIPTION OF THE DRAWINGS

FIG. 4 shows a block diagram of yet another example of a system according to some aspects of the present disclosure.

FIG. 5 shows an example of process for dynamically resizing a region of a volatile memory according to some aspects of the present disclosure.

DETAILED DESCRIPTION

Figure 1:
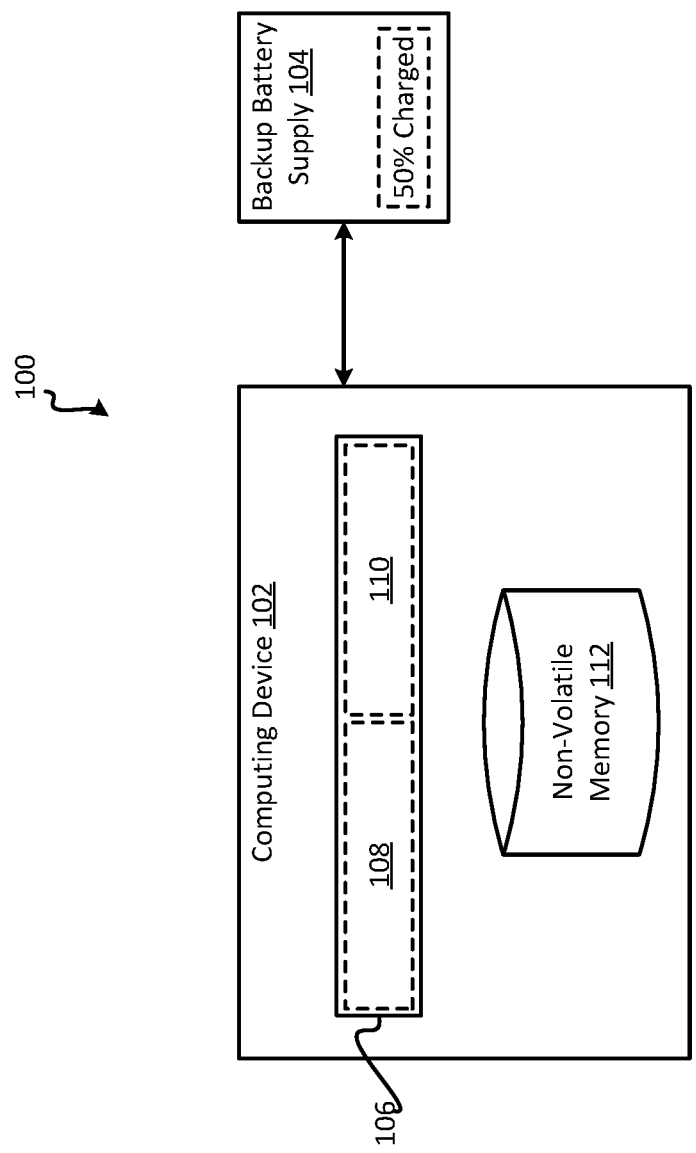
FIG. 1 shows a block diagram of an example of a system in which a backup battery supply is 50% charged according to some aspects of the present disclosure.

In a typical scenario, a computing device can include a volatile memory such as a cache memory with a dedicated region of a fixed size for use in performing storage operations, such as write-back caching operations. The computing device may also have a backup battery supply, such as an uninterruptable power supply (UPS). The backup battery supply can provide backup power to the computing device if a main power supply is interrupted, so that the data stored in the dedicated region can be safely destaged before the backup battery supply fully depletes. Destaging can involve writing data stored in a volatile memory to a nonvolatile memory such as a hard disk, to prevent the data from being inadvertently erased. It is generally assumed that the backup battery supply will be fully charged when a power loss event occurs, so that the backup battery supply can power the computing device for a sufficient amount of time to allow the stored data to be fully destaged. But that is not always the case. For example, there can be multiple power-loss events in a row, where there is an insufficient amount of time between the power-loss events for the backup battery supply to fully recharge. This may cause the destaging process to occur while the backup battery supply is not fully charged, which can result in data loss if there is more stored data than can be destaged given the charge level of the backup battery supply.

Some examples of the present disclosure can overcome one or more of the abovementioned problems by automatically scaling the size of a memory region in a volatile memory based on a charge level of a backup battery supply. The memory region may be dedicated to performing write-back caching or otherwise for storing data to be destaged in the event of a power failure. The dynamic scaling can occur at runtime based on the charge level of the backup battery supply. For example, a computing device can detect a charge level of an attached backup battery supply and responsively adjust the size of the memory region proportionally to the detected charge level. As a result, the size of the memory region can be increased if the charge level increases and can be decreased if the charge level decreases. Dynamically scaling the size of the memory region in this way can prevent data loss by helping to ensure that the amount of data stored in the memory region at a given point in time does not exceed the amount of data that can be safely destaged based on the charge level of the backup battery supply at that point in time.

As one particular example, a computing device forming a node of a cloud computing environment can have write-back caching enabled to help expedite write operations. The computing device can have a cache memory with a memory region dedicated for use in performing write-back caching. The computing device can also be coupled to a UPS to help prevent cached data in the memory region from being inadvertently erased in the event of a power failure. The memory region can be configured to encompass a certain total amount of space in the cache memory when the UPS is fully charged. For example, the memory region can be configured to encompass a maximum of 2 Megabytes (MB) of space in the cache memory when the UPS is fully charged. The size of the memory region can then be dynamically reduced as the UPS depletes to help ensure that there is not more cached data in the memory region than can be safely destaged given the charge level of the UPS. And the size of the memory region can be dynamically increased as the UPS recharges, to help ensure that the cache memory is not being underutilized given the charge level of the UPS.

For example, the computing device can receive a signal from the UPS indicating that the UPS is 60% of the way charged to full battery capacity. Based on the signal from the UPS, the computing device can determine the UPS is 60% charged. The computing device may then reduce the size of the memory region from 2 MB to 1.2 MB, which is 60% of the 2 MB total. If the UPS is then recharged to 80%, the computing device may correspondingly increase the size of the memory region from 1.2 MB to 1.6 MB, which is 80% of 2 MB total. In this way, the computing device can proportionally scale the size of the memory region based on the charge level of the UPS.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a block diagram of an example of a system 100 according to some aspects of the present disclosure. The system 100 includes a computing device 102, such as a server, laptop computer, or mobile phone. The computing device 102 be part of a distributed computing environment, such as a cloud computing environment, computing cluster, or data grid. Attached to the computing device 102 is a backup battery supply 104 configured to provide backup power to the computing device 102 if a main power supply for the computing device 102 is interrupted.

The computing device 102 can include a volatile memory 106, such as a cache memory or a random access memory (RAM). The volatile memory 106 can be divided up into a first memory region 108 and a second memory region 110 that is non-overlapping with the first memory region 108. The first memory region 108 can be dedicated to storing data that is to be destaged in the event of a power loss. One example of such data can be write-back caching data. The second memory region 110 can be dedicated to storing data that is not to be destaged in the event of a power loss. One example of such data can be read-caching data. The second memory region 110 may be sized to take up a remainder of the space in the volatile memory 106 that is not allocated to the first memory region 108.

In some examples, the computing device 102 can determine a charge level of the backup battery supply 104 and responsively adjust the size of the first memory region 108 and the size of the second memory region 110 based on the determined charge level. For example, as the backup battery supply 104 charges and depletes over time, the computing device can scale the size of the first memory region 108 proportionally to the charge level. This can prevent there from being more data in the first memory region 108 than it is possible to destage at any given time based on the charge level of the backup battery supply 104. The computing device may also scale the size of the second memory region 110 inversely proportionally to the charge level, so that a remainder of the volatile memory 106 can be used for other storage operations (e.g., read caching).

Figure 2:
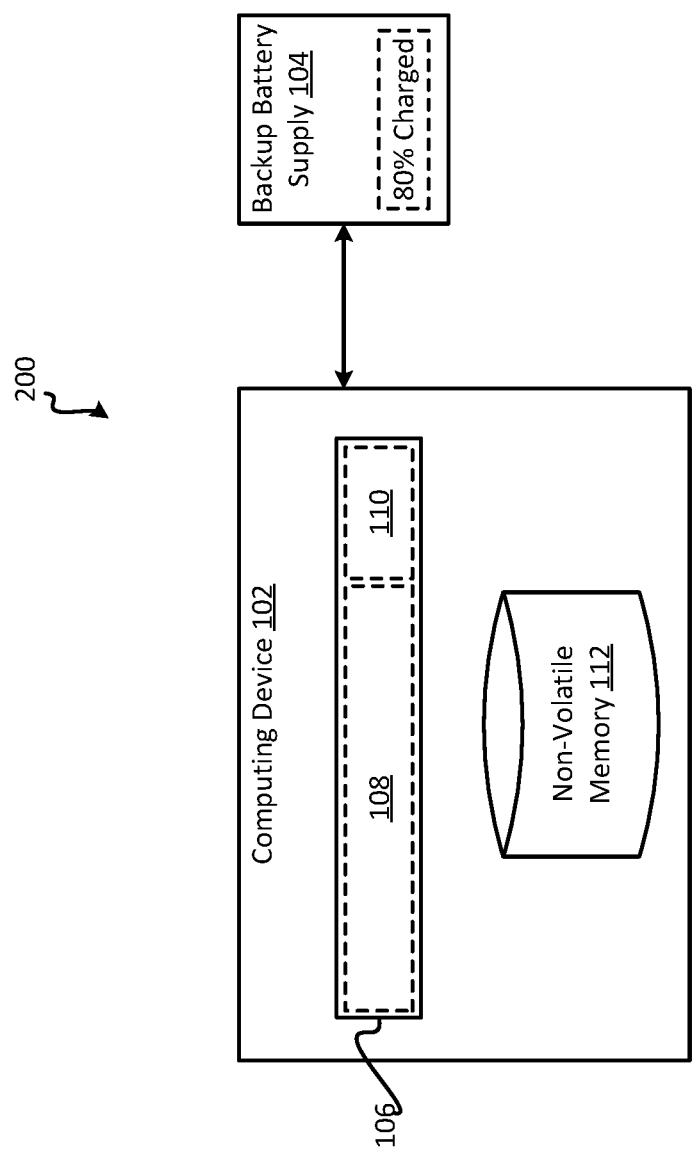
FIG. 2 shows a block diagram of another example of a system in which a backup battery supply is 80% charged according to some aspects of the present disclosure.

One example of this dynamic scaling process is shown in FIG. 2. In this example, the computing device 102 can determine that the backup battery supply 104 is 80% charged. So, the computing device 102 can increase the size of the first memory region 108 to encompass 80% of the total space in the volatile memory 106. Increasing the size of a memory region can involve allocating more space in the volatile memory 106 to the memory region for use in storing data associated with a particular storage operation (e.g., write-back caching). The computing device 102 may also decrease the size of the second memory region 110 to encompass 20% of the total space in the volatile memory 106. Decreasing the size of a memory region can involve allocating less space in the volatile memory 106 to the memory region for use in storing data associated with a particular storage operation.

Figure 3:
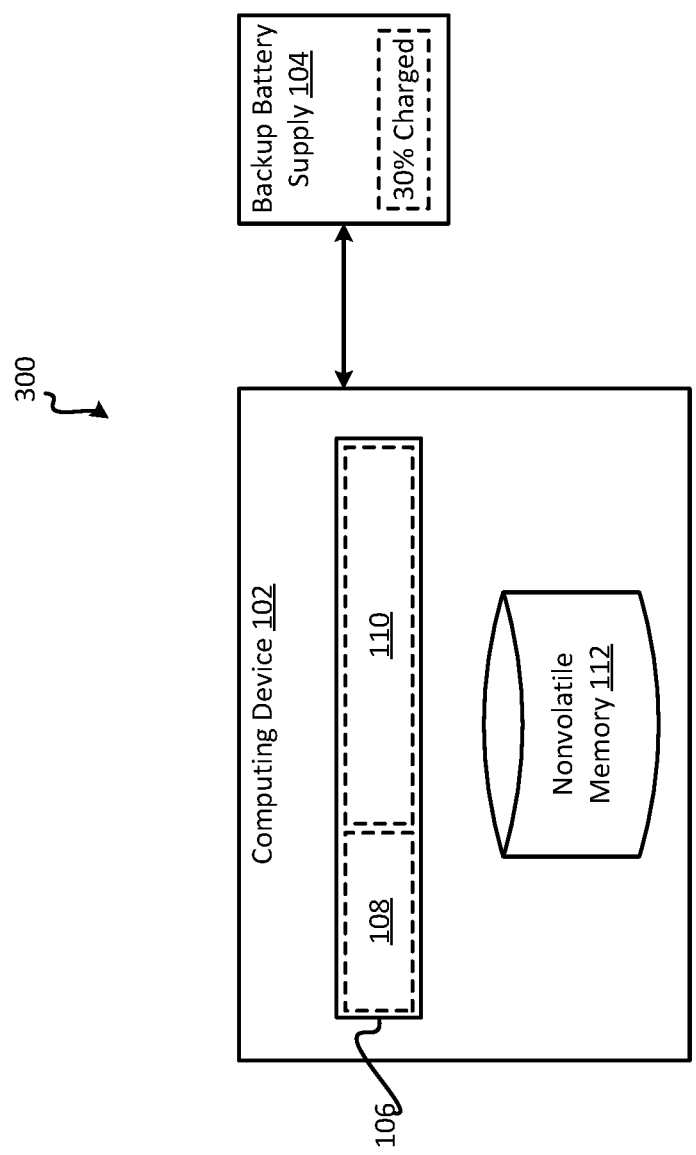
FIG. 3 shows a block diagram of another example of a system in which a backup battery supply is 30% charged according to some aspects of the present disclosure.

Another example of the dynamic scaling process is shown in FIG. 3. In this example, the computing device 102 can determine that the backup battery supply 104 is 30% charged. Based on the backup battery supply 104 being 30% charged, the computing device 102 can decrease the size of the first memory region 108 to encompass 30% of the space in the volatile memory 106. And the computing device 102 can correspondingly increase the size of the second memory region 110 to encompass 70% of the space in the volatile memory 106.

As part of the process for decreasing the size of a memory region (e.g., first memory region 108), the computing device 102 may store excess data to a nonvolatile memory 112 to prevent the excess data from being lost. For example, the computing device 102 can determine a difference between a current amount of data stored in the memory region and a target amount of data to be stored in the memory region once the memory region has been scaled down to the desired target size. The computing device 102 may then store the excess data to a nonvolatile memory 112 such as a hard disk, which can prevent that data from being lost. As one particular example, the computing device 102 can determine that there is 1.2 MB of data currently stored in the first memory region 108, but that after scaling down the first memory region 108 will only be large enough to store 0.8 MB of data. So, the computing device 102 can store the excess 0.4 MB of data in the nonvolatile memory 112 to prevent the excess data from being lost.

While the above examples involve the size of the first memory region 108 being dynamically scaled to exactly match the amount of charge in the backup battery supply 104 (e.g., 80%), other examples may involve other scaling schemes. For instance, it may be desirable to have more battery charge than is theoretically needed to destage all of the data in the first memory region 108, to allow for a margin of error. So, the computing device 102 may scale the size of the first memory region 108 slightly less than the charge level. For example, if the backup battery supply 104 is 80% charged, the computing device 102 can adjust the size of the first memory region 108 to encompass 77% of the space in the volatile memory 106. Or if the backup battery supply 104 is 30% charged, the computing device 102 can adjust the size of the first memory region 108 to encompass 25% of the space in the volatile memory 106. This can help ensure that all of the data in the first memory region 108 can be safely destaged given the charge level of the backup battery supply 104.

It will be appreciated that the examples shown in FIGS. 1-3 are intended to be illustrative and non-limiting. Other examples may include more components, fewer components, different components, or a different arrangement of the components shown in these figures. For instance, in other examples the volatile memory 106 can be segmented into three or more memory regions, some or all of which may also be dynamically scaled in size based on the charge level of the backup battery supply 104.

Another example of a system 400 for implementing some aspects of the present disclosure is shown in FIG. 4. As shown, the system 400 can include a computing device 102 coupled to a backup battery supply 104, where the computing device 102 can include a volatile memory 106. The volatile memory 106 can include a memory region 404 that may be similar to the first memory region 108 of FIG. 1.

The computing device 102 can also include a processor 406. The processor 405 may be communicatively coupled to the cache memory 402 and another memory 408. The processor 406 can include one processor or multiple processors. Non-limiting examples of the processor 406 include a Field-Programmable Gate Array (FPGA), an applicationspecific integrated circuit (ASIC), a microprocessor, etc. The processor 406 can execute instructions 410 stored in the memory 408 to perform operations. The instructions 410 can include processor-specific instructions generated by a compiler or an interpreter from code written in any suitable computer-programming language, such as C, C++, C#, etc.

The memory 408 can include one memory or multiple memories. Non-limiting examples of the memory 408 can include electrically erasable and programmable read-only memory (EEPROM), flash memory, or any other type of non-volatile memory. At least some of the memory 408 includes a non-transitory computer-readable medium from which the processor 406 can read the instructions 410. The non-transitory computer-readable medium can include electronic, optical, magnetic, or other storage devices capable of providing the processor 406 with computer-readable instructions or other program code. Examples of the non-transitory computer-readable medium can include magnetic disks, memory chips, ROM, random-access memory (RAM), an ASIC, optical storage, or any other medium from which a computer processor can read the instructions 410.

In some examples, the processor 406 can execute the instructions 410 to determine a charge level of the backup battery supply 104 coupled to the computing device 102. The charge level is represented in FIG. 4 by X %. The processor 406 can then adjust a size of the memory region 404 based on the determined charge level. Adjusting the size of the memory region 404 involves changing (e.g., increasing or decreasing) an amount of the volatile memory 106 that is allocated to the memory region 404. This adjustment is represented in FIG. 4 by a double-headed dashed arrow.

In some examples, the processor 406 can implement some or all of the steps shown in FIG. 5. Other examples can include more steps, fewer steps, different steps, or a different order of the steps than is shown in FIG. 5. The steps of FIG. 5 are discussed below with reference to the components described above in relation to FIG. 4.

In block 502, a processor 406 of a computing device 102 determines a charge level (e.g., X %) of a backup battery supply 104 coupled to the computing device 102. For example, the processor 406 can receive a signal from the backup battery supply 104. The signal may be an analog or digital signal. The signal can indicate the charge level of the backup battery supply 104. The processor 406 can then analyze the signal to determine the charge level based on the signal. In some examples, the processor 406 can determine the charge level by using an application programming interface (API), a driver, or firmware configured for interacting with the backup battery supply 104.

In block 504, the processor 406 adjusts a size of a memory region 404 in a volatile memory 106 of the computing device 102 based on the determined charge level. Adjusting the size of the memory region 404 can involve changing how much of the volatile memory 106 is allocated to the memory region 404. In some examples, the processor 406 can increase the size of the memory region 404 based on an increase in the charge level. And the processor 406 can decrease the size of the memory region 404 based on a decrease in the charge level. This may help ensure that the amount of data stored in the memory region 404 does not exceed an amount of data that can be safely destaged at a given point in time based on the charge level of the backup battery supply 104.

The processor 406 can use any suitable technique or combination of techniques to adjust the size of the memory region 404. For example, the processor 406 can adjust the size of the memory region 404 by changing an allocation of memory blocks ("blocks") in the volatile memory 106 to the memory region 404. In particular, the processor 406 can allocate more blocks to the memory region 404 to increase the size of the memory region 404, and allocate fewer blocks to the memory region 404 to decrease the size of the memory region 404. As another example, the processor 406 can adjust the size of the memory region 404 by changing an allocation of memory pages ("pages") in the volatile memory 106 to the memory region 404. In particular, the processor 406 can allocate more pages to the memory region 404 to increase the size of the memory region 404, and allocate fewer pages to the memory region 404 to decrease the size of the memory region 404.

Other techniques for adjusting the size of the memory region 404 are also possible. For example, the processor 406 can adjust the size of the memory region 404 by changing a partition size of the memory region 404. In particular, the computing device 102 may store a starting memory address for the memory region 404 and/or an ending memory address for the memory region 404. Such values may be stored in one or more registers that form part of the firmware, operating system, or another part of the computing device 102. The computing device 102 can dynamically update the values in the one or more registers at run-time to repartition or otherwise resize the memory region 404. As another example, the volatile memory 106 can include a bank of volatile-memory devices, such as a bank of cache memories. In such situations, the memory region 404 may be capable of logically spanning more than one of the volatile-memory devices. The processor 406 can adjust the size of the memory region 404 by modifying how many of the volatile-memory devices are logically designated to the memory region 404. In particular, the processor 406 can allocate more of the volatile-memory devices to the memory region 404 to increase the size of the memory region 404, and allocate fewer of the volatile-memory devices to the memory region 404 to decrease the size of the memory region 404. In some examples, the processor 406 may coordinate with a hardware- or software-memory manager to effectuate any of the above processes or other processes for adjusting the size of the memory region 404.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A computing device comprising:
   a volatile memory that includes a memory region for storing data;
   a processor communicatively coupled to the volatile memory; and
   a memory including instructions that are executable by the processor for causing the processor to:
      determine a charge level of a backup battery supply coupled to the computing device;
      determine, based on the charge level, that a size of the memory region is to be reduced from a first size to a second size;
      identify excess data in the memory region corresponding to a difference between the first size and the second size;
      store the excess data to a non-volatile memory; and subsequent to storing the excess data in the non-volatile memory, reduce the size of the memory region from the first size to the second size, wherein reducing the size of the memory region involves changing an amount of the volatile memory that is allocated to the memory region.

2. The computing device of claim 1, wherein the memory further includes instructions that are executable by the processor for causing the processor to adjust the size of the memory region proportionally to the charge level.

3. The computing device of claim 1, wherein the memory region is a first memory region dedicated for use in performing write-back caching, and wherein the volatile memory further includes a second memory region dedicated for use in performing read caching, the second memory region being separate from the first memory region.

4. The computing device of claim 3, wherein the memory further includes instructions that are executable by the processor for causing the processor to adjust another size of the second memory region based on the charge level.

5. The computing device of claim 4, wherein the memory further includes instructions that are executable by the processor for causing the processor to adjust the other size of the second memory region inversely proportionally to the charge level.

6. The computing device of claim 3, wherein the memory further includes instructions that are executable by the processor for causing the processor to:
decrease the size of the first memory region based on the charge level; and
increase another size of the second memory region based on the charge level.

7. The computing device of claim 3, wherein the memory further includes instructions that are executable by the processor for causing the processor to:
increase the size of the first memory region based on the charge level; and
decrease another size of the second memory region based on the charge level.

8. The computing device of claim 1, wherein the memory further includes instructions that are executable by the processor for causing the processor to dynamically adjust the size of the memory region based on the charge level of the backup battery supply.

9. A method comprising:
determining, by a computing device, a charge level of a backup battery supply coupled to the computing device;
determining, by the computing device and based on the charge level, that a size of a memory region in a volatile memory of the computing device is to be reduced from a first size to a second size;
identifying, by the computing device, excess data in the memory region corresponding to a difference between the first size and the second size;
storing, by the computing device, the excess data to a non-volatile memory; and
subsequent to storing the excess data in the non-volatile memory, reducing, by the computing device, the size of the memory region from the first size to the second size, wherein reducing the size of the memory region involves changing an amount of the volatile memory that is allocated to the memory region.

10. The method of claim 9, further comprising adjusting the size of the memory region proportionally to the charge level.

11. The method of claim 9, wherein the memory region is a first memory region configured for storing data to be destaged in response to a power loss event, and wherein the volatile memory further includes a second memory region that is separate from the first memory region.

12. The method of claim 11, further comprising adjusting another size of the second memory region based on the charge level.

13. The method of claim 12, further comprising adjusting the other size of the second memory region inversely proportionally to the charge level.

14. The method of claim 11, further comprising:
decreasing the size of the first memory region based on the charge level; and
increasing another size of the second memory region based on the charge level.

15. The method of claim 11, further comprising:
increasing the size of the first memory region based on the charge level; and
decreasing another size of the second memory region based on the charge level.

16. The method of claim 11, further comprising dynamically adjusting the size of the memory region based on the charge level of the backup battery supply.

17. The method of claim 9, further comprising reducing the size of the memory region based on a scaling scheme that is configured to impart a margin of error such that the second size of the memory region is smaller than a total amount of data capable of being destaged at the charge level.

18. A non-transitory computer-readable medium comprising program code that is executable by a processor of a computing device for causing the processor to:
determine a charge level of a backup battery supply coupled to the computing device;
determine, based on the charge level, that a size of a memory region of a volatile memory is to be reduced from a first size to a second size;
identify excess data in the memory region corresponding to a difference between the first size and the second size;
store the excess data to a non-volatile memory; and
subsequent to storing the excess data in the non-volatile memory, reduce the size of the memory region. from the first size to the second size, wherein reducing the size of the memory region involves changing an amount of the volatile memory that is allocated to the memory region.

19. The non-transitory computer-readable medium of claim 18, wherein the memory region is a first memory region, and further comprising program code that is executable by the processor for causing the processor to:
adjust the size of the first memory region proportionally to the charge level; and
adjust another size of a second memory region inversely proportionally to the charge level, the second memory region being part of the volatile memory and separate from the first memory region.

20. The non-transitory computer-readable medium of claim 18, wherein the memory region is a first memory region, and further comprising program code that is executable by the processor for causing the processor to:
decrease the size of the first memory region based on a decrease in the charge level; and
increase another size of a second memory region based on the decrease in the charge level, the second memory region being part of the volatile memory and separate from the first memory region.

\* \* \* \* \*